United States Patent
Takamatsu et al.

(10) Patent No.: US 9,468,199 B2
(45) Date of Patent: Oct. 18, 2016

(54) REEL PART FOR FISHING REEL

(71) Applicant: Shimano Inc., Sakai, Osaka (JP)

(72) Inventors: Takuji Takamatsu, Osaka (JP); Kentaro Hayashi, Osaka (JP); Shouji Nakagawa, Osaka (JP)

(73) Assignee: Shimano Inc., Osaka (JP)

( * ) Notice: Subject to any disclaimer, the term of this patent is extended or adjusted under 35 U.S.C. 154(b) by 353 days.

(21) Appl. No.: 14/181,921

(22) Filed: Feb. 17, 2014

(65) Prior Publication Data

US 2014/0291430 A1  Oct. 2, 2014

(30) Foreign Application Priority Data

Mar. 29, 2013 (JP) .................... 2013-073705

(51) Int. Cl.
| | |
|---|---|
| *A01K 89/01* | (2006.01) |
| *A01K 89/00* | (2006.01) |
| *A01K 89/015* | (2006.01) |
| *F16H 55/06* | (2006.01) |
| *F16H 55/17* | (2006.01) |

(52) U.S. Cl.
CPC ............. *A01K 89/006* (2013.01); *A01K 89/00* (2013.01); *A01K 89/01* (2013.01); *A01K 89/015* (2013.01); *F16H 55/06* (2013.01); *F16H 55/17* (2013.01)

(58) Field of Classification Search
CPC .............. A01K 89/01; A01K 89/015; A01K 89/01902
See application file for complete search history.

(56) References Cited

U.S. PATENT DOCUMENTS

| | | | | |
|---|---|---|---|---|
| 6,095,008 A * | 8/2000 | Hitomi | .................... | A01K 89/01 242/247 |
| 6,102,315 A * | 8/2000 | Sato | ....................... | A01K 89/01 242/249 |
| 6,176,446 B1 * | 1/2001 | Sato | ....................... | A01K 89/01 242/282 |
| 6,343,418 B1 * | 2/2002 | Hitomi | .................... | A01K 89/01 164/98 |
| 6,533,202 B1 * | 3/2003 | Koike | ..................... | A01K 89/01 242/310 |
| 2004/0021022 A1 * | 2/2004 | Amano | .................. | A01K 89/01 242/249 |
| 2004/0079822 A1 * | 4/2004 | Kawasaki | ............ | A01K 89/015 242/322 |
| 2005/0274838 A1 * | 12/2005 | Sugahara | ........... | A01K 89/0111 242/306 |
| 2007/0181728 A1 * | 8/2007 | Kawasaki | .............. | A01K 89/00 242/310 |
| 2011/0233316 A1 * | 9/2011 | Chan | ...................... | A01K 89/01 242/224 |
| 2012/0128414 A1 * | 5/2012 | Hiraoka | ............. | A01K 89/0114 403/354 |

FOREIGN PATENT DOCUMENTS

| | | | | |
|---|---|---|---|---|
| EP | 2 494 866 A1 | 9/2012 | | |
| EP | 2883450 A1 * | 6/2015 | ............. | A01K 89/01 |
| JP | 10-150889 A | 6/1998 | | |

OTHER PUBLICATIONS

European Search Report of corresponding EP Application No. 14 15 6732.1 dated Aug. 29, 2014.

* cited by examiner

Primary Examiner — Emmanuel M Marcelo
(74) Attorney, Agent, or Firm — Global IP Counselors

(57) ABSTRACT

A reel part is provided for a fishing reel. The reel part includes an inner member and an outer member. The inner member has a surface treatment layer. The outer member is fixed to an outer peripheral side of the inner member. The outer member includes a processed part that is processed after being fixed to the inner member.

13 Claims, 10 Drawing Sheets

REEL PART FOR FISHING REEL

CROSS-REFERENCE TO RELATED APPLICATIONS

This application claims priority to Japanese Patent Application No. 2013-073705, filed on Mar. 29, 2013. The entire disclosure of Japanese Patent Application No. 2013-073705 is hereby incorporated herein by reference.

BACKGROUND

1. Field of the Invention

The present invention generally relates to a reel part. More specifically, the present invention relates to a reel part for a fishing reel.

2. Background Information

Reel parts that require strength and need to be lightweight are used for fishing reels. For example, a drive gear that transmits the rotation of the handle to the spool must have strong gear teeth in order to pull in fish with a strong pull. However, if a member with an overall high degree of strength is used, making the drive gear lightweight is difficult. Thus, in order to maintain the strength of the drive gear and to make the drive gear lightweight, in a drive gear as a reel part for a spinning reel, one that comprises an aluminum alloy disc part and a zinc alloy teeth part on the outer periphery of the disc part is conventionally known (refer to, for example, Japanese Laid-Open Patent Publication No. 1998-150889). In a conventional reel part, the teeth part is integrally molded on the outer periphery of the disc by outsert molding.

SUMMARY

Generally, with light alloys of aluminum, etc., surface treatment layer such as anodic oxide layer, etc., is firmed in order to improve corrosion resistance. If a zinc alloy is integrally molded to a disc part on which such a surface treatment layer is formed, there is the possibility that the surface treatment layer will be damaged and that the performance of the surface treatment layer in the reel part will degrade.

Additionally, if the gear teeth are formed using outsert molding, there is the risk that the accuracy of the gear teeth will decrease. If the accuracy of the gear teeth decreases, the engagement of the drive gear and gears that engage with the drive gear becomes poor, complicating the smooth rotation of the rotating parts that rotate with the rotation of the drive gear, such as a spool or a rotor.

One object of the present invention is to achieve a lightweight reel part while maintaining the accuracy, strength, and surface treatment layer performance of the reel part.

The reel part for fishing reels according to the present invention comprises an inner member and an outer member. The inner member comprises a surface treatment layer. The outer member comprises a processed part. The outer member is fixed on the outer peripheral side of the inner member, and is processed after being fixed to the inner member to form the processed part.

In this reel part, after an outer member is fixed to an inner member that has a surface treatment layer, the processed part of the outer member is processed. With this, the surface treatment layer will no longer be affected; therefore, the performance of the surface treatment layer can be maintained, and the accuracy for the processed part can remain high. Additionally, by using a material with a small specific gravity for the inner member and by using that with high rigidity for the outer member, the strength can be maintained, and a lightweight can be achieved.

The processed part can comprise gear teeth. In this case, the strength of the gear teeth can be maintained.

The gear teeth can also be formed by machining. In this case, the gear teeth can be formed with a high degree of accuracy.

The gear teeth can also be formed by casting. In this case, the face gear teeth, which increases the cost when formed by machining, can be formed while suppressing an increase in cost.

The inner member can be made from a first metal having a corrosion-resistant layer as the surface treatment layer, and the outer member can have gear teeth and be made from a second metal that has a specific gravity that is larger and a rigidity that is higher than the first metal. In this case, lightweight gears can be achieved while the strength and corrosion resistance of the gear teeth are maintained.

The inner member can fit the outer member and can be fixed to the outer member by press fitting. In this case, the inner member and the outer member can be solidly fixed by press fitting.

The inner member can be fixed to the outer member by plastic deformation towards the outer member. In this case, for example, the inner member and the outer member can be solidly fixed by plastic deformation, such as press fixing, etc.

The inner member can be fixed to the outer member by bonding. In this case, the inner member and the outer member can be easily fixed. Additionally, by combining the fixing and bonding by press fitting or plastic deformation mentioned above, the inner member and the outer member can be more solidly fixed.

The inner member can comprise a male threaded part, and the outer member can comprise a female threaded part that screws onto the male threaded part. In this case, the inner member and the outer member can be easily fixed by a threaded engagement.

The inner member and the outer member can each comprise a detent part to engage with each other and to prevent the rotation. In this case, since the brakes will be applied to the rotation of the inner member and the outer member, even if the inner member and the outer member are fixed by press fitting, elastic deformation, bonding, etc., the inner member and outer member can be reliably rotated integrally.

The inner member can be mounted on a drive axle that rotates in conjunction with a handle of the fishing reel, and the gear teeth of the outer member can engage with a pinion gear that rotates around a spool axis of the fishing reel. In this case, a lightweight drive gear can be achieved while maintaining the accuracy, the strength, and the surface treatment layer performance of the drive gear of a dual-bearing reel, a spinning reel, or a single-bearing reel.

The fishing reel can be a dual-bearing reel that has a spool that rotates around an axis of a spool axle that is parallel with an axis of a drive axle. The inner member is rotatably mounted on the drive axle in conjunction with the drive axle of the dual-bearing reel. In this case, in the dual-bearing reel, a lightweight drive gear can be achieved while maintaining the accuracy, strength, and surface treatment layer performance of the drive gear.

The fishing reel can be a spinning reel having a spool that reciprocates forward and backward in an axial direction of a spool axle that is transverse to an axis of the drive axle, and the inner member can be integrally and rotatably mounted on the drive axle of the spinning reel. In this case, in the spinning reel, a lightweight drive gear can be achieved while maintaining the accuracy, strength, and surface treatment layer performance of the drive gear.

According to the present invention, a lightweight reel part can be achieved while maintaining the accuracy, strength, and the surface treatment layer performance of the reel part.

Other objects, features, aspects and advantages of the disclosed reel part for a fishing reel will become apparent to those skilled in the art from the following detailed description, which, taken in conjunction with the annexed drawings, discloses preferred embodiments of the reel part for a fishing reel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
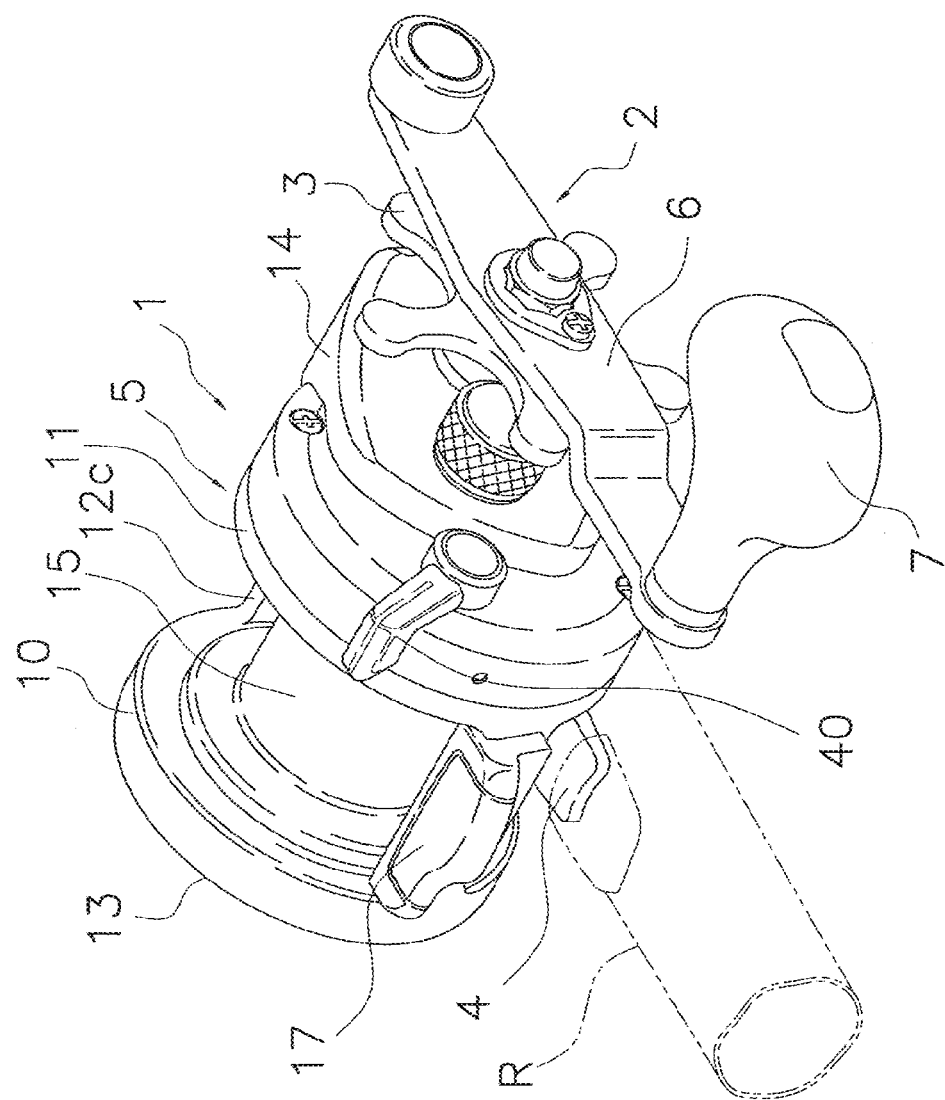
FIG. 1 is a cross-sectional diagram of a dual-bearing reel employing a first embodiment of the present invention.

In FIG. 1, a dual-bearing reel employing the first embodiment of the present invention is, for example, a medium-sized round reel used for jigging. The round reel comprises a reel body 1, a handle 2 for rotating a spool that is disposed on the side of the reel body 1, and a star drag 3 that is disposed on the reel body 1 side of the handle 2. A spool 15 is rotatably mounted on the reel body 1. The reel body 1 can be mounted to the fishing rod R via a fishing rod mounting leg 4.

Figure 2:
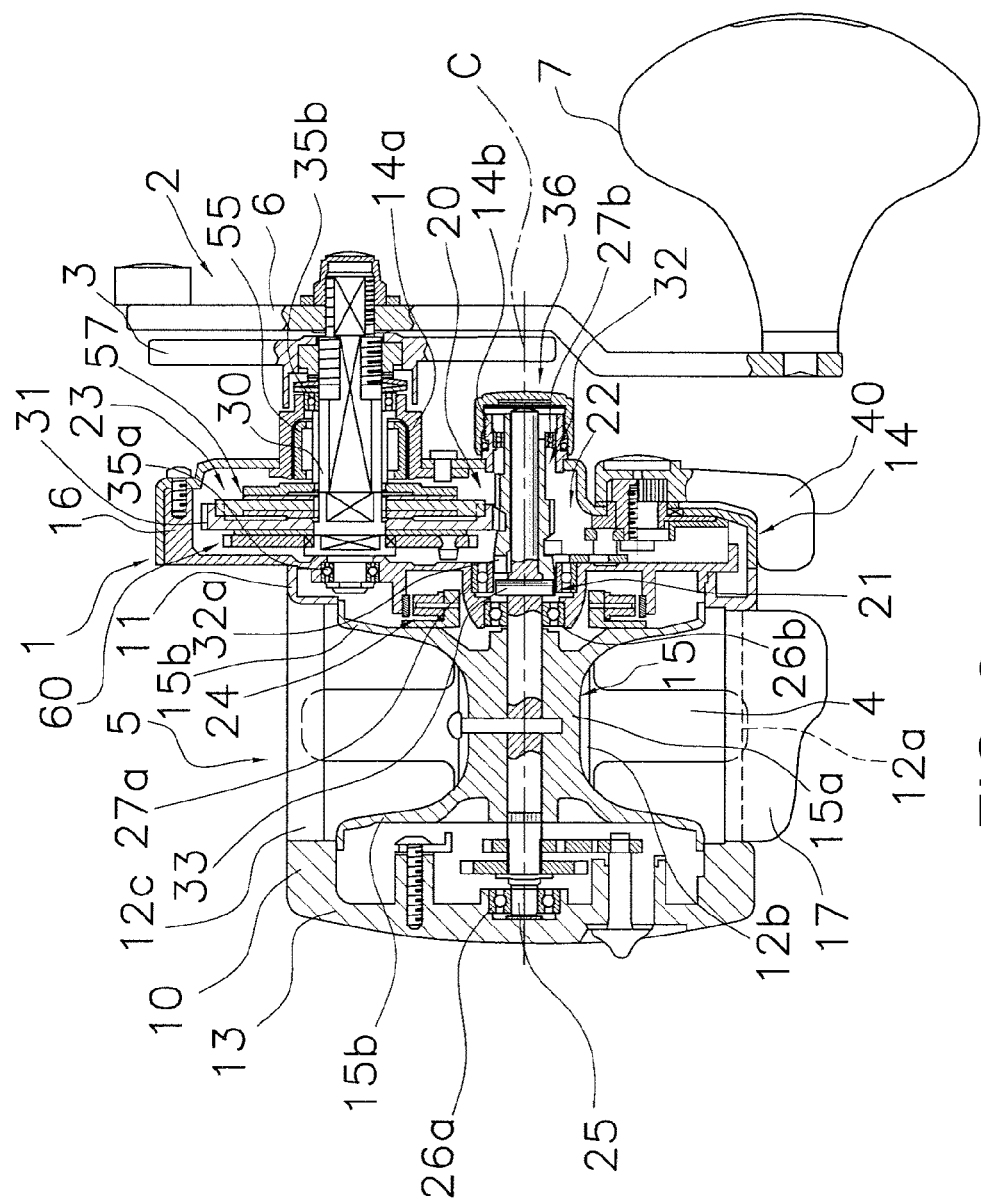
FIG. 2 is a plan view cross-sectional diagram of the dual-bearing reel.

The reel body 1, as shown in FIG. 2 comprises a frame 5, a first side cover 13, a second side cover 14, and a mechanism mounting plate 16. The frame 5 comprises a first side plate 10 and a second side plate 11 that are disposed with a predefined gap in between them, a rear part coupling member 12a that couples the first side plate 10 and the second side plate 11 in the rear part, a lower part coupling member 12b that couples them in the lower part, and a front part coupling member 12c that couples them in the front part. The first side cover 13 is integrally formed with the first side plate so as to cover the first side plate 10 laterally. The second side cover 14 is integrally formed with the second side plate so as to cover the second side plate 11 laterally. The mechanism mounting plate 16 is disposed on the second side plate 11, and a space to house the various mechanisms mentioned below is formed between the mechanism mounting plate 16 and the second side cover 14.

Figure 3:
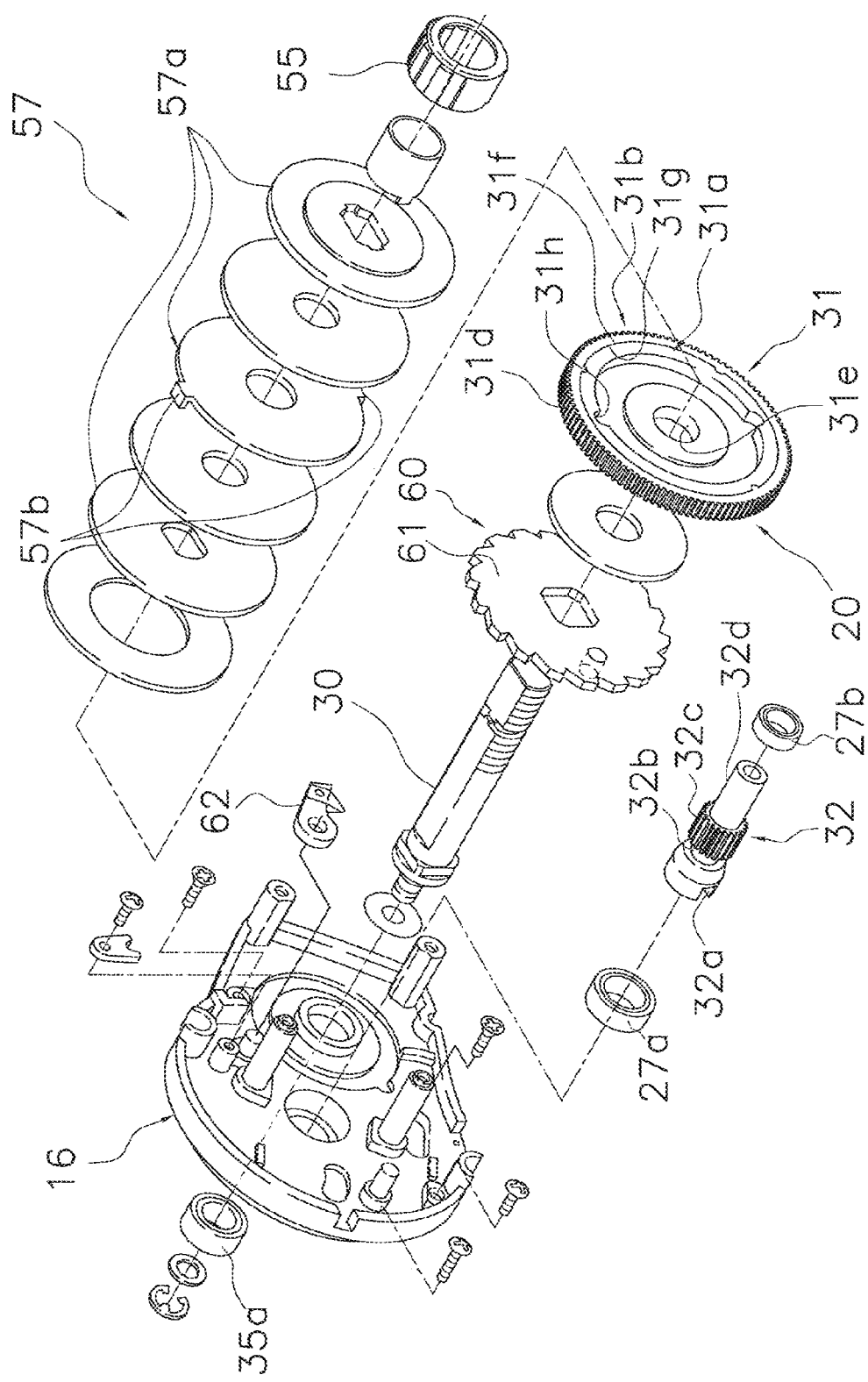
FIG. 3 is an exploded perspective view of the rotation transmission mechanism of the dual-bearing reel as well as of the surroundings.

The frame 5 is obtained through die cast molding, and the second side cover 14 is obtained through press molding a thin metal plate. The first side plate 10, the second side plate 11, and the first side cover 13 each form a near circle when seen from the side, and the outer peripheral surface is machined using, for example, a lathe, etc. The second side cover 14 and the mechanism mounting plate 16, as shown in FIGS. 1 to 3, each have a shape in which a part of the near circle, as seen from the side, protrudes in the radial direction. The second side cover 14 bulges outwardly the axial direction with the mounting part of the drive axle 30 (mentioned below) as the center.

The rear part coupling member 12a, the lower part coupling member 12b, and the front part coupling member 12c are plate-like members that are integrally formed with the first side plate 10 and the second side plate 11 in a shape that follows the outer periphery of the first side plate 10 and the second side plate 11. The rear part coupling member 12a, the lower part coupling member 12b, and the front part coupling member 12c couple the first side plate 10 and the second side plate 11 in three locations. In this way, by integrally forming the first side plate 10 and the second side plate 11 with the rear part coupling member 12a, the lower part coupling member 12b, and the front part coupling member 12c, deformation such as sagging will not easily occur even if a large load is applied to the reel body 1, and a decrease in the reeling efficiency is suppressed. The outer peripheral part of these coupling members 12a, 12b and 12c are integrally machined with the first side plate 10, second side plate 11, and the first side cover 13.

A fishing rod mounting leg 4 is fixed to the lower part coupling member 12b. The fishing rod mounting leg 4 is disposed in the longitudinal direction along the center position between the first side plate 10 and the second side plate 11 of the frame 5. This center position is also the center position of the spool part of the spool 15. A synthetic resin thumb rest 17 for retaining the reel along with the fishing rod R is mounted on the rear part coupling member 12a.

The thumb rest 17 is formed so as to come into contact with the upper part and the rear part of the rear part coupling member 12a, and the rear part protrudes in the radial direction outward from the first side plate 10 and the second side plate 11, i.e., rearward. The upper surface rear part of the thumb rest 17 is tilted while curving convexly downward. Additionally, the protrusion amount rearward of the left end and the right end of the upper surface rear part of the thumb rest 17 gradually declines toward the left side.

By installing a thumb rest 17 with this kind of shape and by putting, for example, the left thumb on this thumb rest 17, holding the fishing rod R with the other fingers and gripping the reel body 1 along with the fishing rod R, the fishing rod R can be reliably retained along with the reel body 1 during vertical jigging, etc.

The handle 2, as shown in FIGS. 2 and 3, comprises a crank arm 6 that is non-rotatably mounted on the tip of the drive axle 30 and a handle grip 7 that is rotatably mounted to one end of the crank arm 6 around the grip shaft axis that intersects perpendicularly with one end part of the crank arm 6. In the handle 2, the rotating plane of the proximal end part of the handle grip 7 is closer to the reel body 1 side than the rotating plane of the fixed part from the crank arm 6 to the drive axle 30. With this, the distance between the handle grip 7 and the fishing rod R becomes closer than in conventional configurations; the torque around the axis of the fishing rod R when the handle grip 7 is rotated and when the fishing line is wound up decreases; and the decrease in the handle winding efficiency can be suppressed.

The spool 15, as shown in FIG. 2, is rotatably disposed between the first side plate 10 and the second side plate 11. The spool 15 comprises a bobbin trunk 15a to which the fishing line is wound, and a pair of flanges 15b that are disposed on both sides of the bobbin trunk 15a. A spool axle 25 is fixed to the center of the bobbin trunk 15a. The spool axle 25 is rotatably supported independently by the reel body 13 via an axle bearing 26a, by the mechanism mounting plate 16 via an axle bearing 26b, and by the second side cover 14 via an axle bearing 27b. A casting control mechanism 36 is disposed on both ends of the spool axle 25.

In the space between the mechanism mounting plate 16 and the second side cover 14 are disposed a rotation transmission mechanism 20 for transmitting the torque from the handle 2 to the spool 15, a clutch mechanism 21 that is installed in the rotation transmission mechanism 20, and a clutch operating mechanism 22 for conducting the on/off operation of the clutch mechanism 21.

The rotation transmission mechanism 20 comprises a rotation control mechanism for regulating the torque when the torque is reversely transmitted from the spool 15 to the side with the handle 2. Additionally, a centrifugal brake mechanism 24 for controlling the spool 15 that freely rotates in the line delivering direction is disposed in the center part of the second side plate 11. Outside of the first side plate 10 and inside of the first side cover 13 are disposed a sounding mechanism that makes a sound during the rotation of the spool 15 and a lock mechanism that completely locks the spool 15 to facilitate the breakage of the line when snagging occurs, etc.

The rotation transmission mechanism 20, as shown in FIGS. 2 and 3, comprises a drive axle 30 on one end where the handle 2 is fixed, a drive gear 31 that is coupled to the other end of the drive axle 30 via the rotation control mechanism 23, and a pinion gear 32 that engages with the drive gear 31. The drive gear 31 is one example of a reel part according to the first embodiment of the present invention.

The drive axle 30 is disposed parallel to the spool axle 25. One end of the drive axle 30 is rotatably supported by the mechanism mounting plate 16 via an axle bearing 35a, and the center part is rotatably supported by a first boss part 14a of the second side cover 14 via an axle bearing 35b. The rotation of the drive axle 30 in the line delivering direction is prohibited by one-way clutches 55 and 60 mentioned below.

Figure 4:
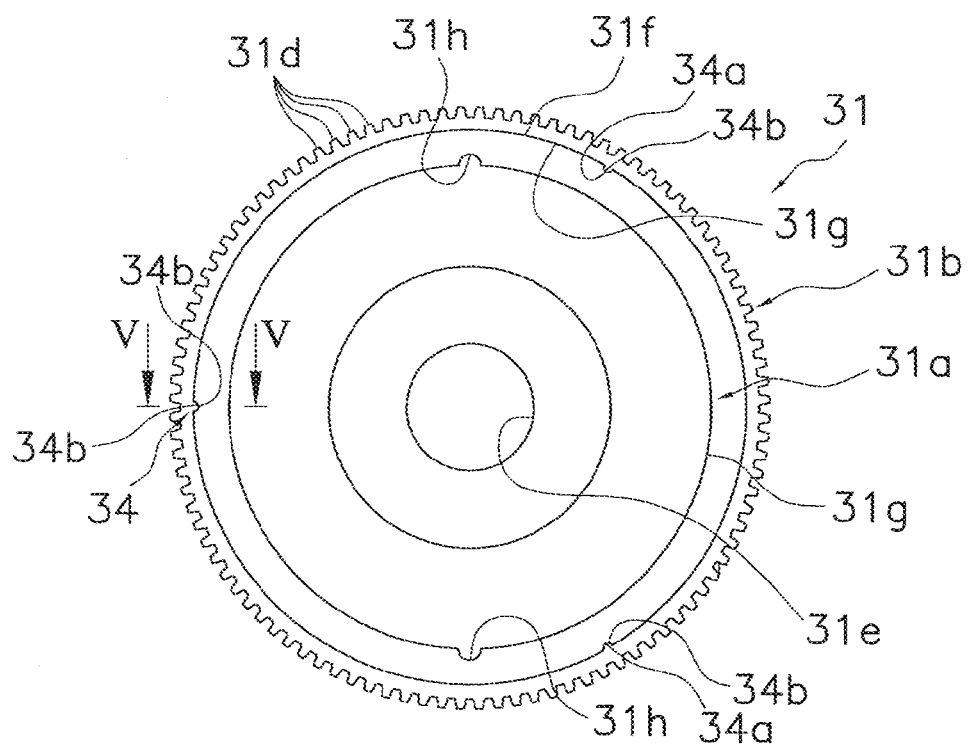
FIG. 4 is a frontal view of the drive gear of the dual-bearing reel.
Figure 5:
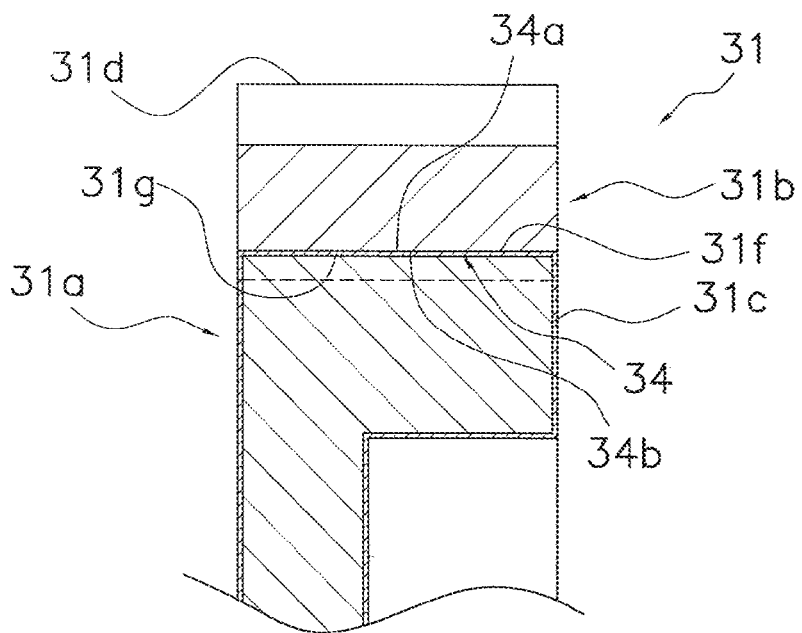
FIG. 5 is a cross-sectional diagram of the section line V-V in FIG. 4.

The drive gear 31 is rotatably mounted to one end side of the drive axle 30 and is integrally rotatable with the drive axle 30 via the rotation control mechanism 23. The drive gear 31, as shown in FIGS. 3 to 5, comprises a disc-shaped inner member 31a that has a surface treatment layer 31c (refer to FIG. 5) and an annular ring-shaped outer member 31b that is fixed to the outer peripheral surface of the inner member 31a and that has multiple gear teeth 31d on the outer peripheral surface. The multiple gear teeth 31d are disposed with a gap in the circumferential direction.

The inner member 31a is, for example, a first metallic member with a relatively small specific gravity, such as aluminum alloys and magnesium alloys. The inner member 31a further comprises a through-hole 31e that is rotatably mounted to the drive axle 30 and a circular outer peripheral part 31f that is fixed by press fitting to the outer member 31b. In the case that the inner member 31a is made from an aluminum alloy or a magnesium alloy, the surface treatment layer 31c is a corrosion-resistant layer such as an anodic oxide layer, etc. The surface treatment layer 31c is formed on the entire surface of the outer surface, including the through-hole 31e of the inner member 31a, the outer peripheral part 31f, an engaging recess 34a of the detent part 34 mentioned below, a surface that intersects perpendicularly with the axis of the drive axle 30, etc.

The inner member 31a is formed so that the outer peripheral side to which the outer member 31b is fixed is formed to be thicker than the inner peripheral side. On the stepped surface of the thin-walled part and the thick-walled part of the inner member 31a, of the plurality of drag washers 57a of a drag mechanism 57 mentioned below, is formed a pair of engaging recesses 31h that are rotatably mounted on the drive axle 30 and that engage with the our parts 57b of the drag washer 57a that has a pair of ear parts 57b on the outer peripheral part. With this, the drive gear 31 and the drag washer 57a will integrally rotate in the line delivering direction with respect to the drive axle 30.

The outer member 31b is a second metallic member with a larger specific gravity and a higher rigidity than the inner member 31a, for example a zinc alloy or a stainless steel alloy. The outer member 31b comprises a circular inner peripheral part 31g that fits the outer peripheral part 31f of the inner member 31a. The gear teeth 31d that are formed on the outer peripheral surface are one example of a processed part, and they are formed through machining (gear cutting) after the outer member 31b is fixed to the inner member 31a. Regarding the gear teeth 31d, the number of teeth is in the range of 100 to 120 and is a helical gear with a helical angle of less than 20 degrees; the pitch circle diameter is around 42 mm, and the module is 0.35.

Additionally, the drive gear 31 further comprises a detent part 34 that is installed between the inner member 31a and the outer member 31b, that engages with the inner member 31a and the outer member 31b and that prevents the rotation of the inner member 31a and the outer member 31b. In the first embodiment, the detent part 34 comprises a plurality of engaging recesses 34a (for example, 3) that are formed as a semi-circle on the outer peripheral part 31f of the inner member 31a and a plurality of engaging protrusions 34b (for example, 3) that are formed in a semi-circle on the inner peripheral part 31g of the outer member 31b so as to engage with the engaging recesses 34a. Here, since an engaging protrusion 34b was thinly formed on the outer member 31b in the radial direction, a decrease in the strength of the outer member 31b can be suppressed. The plurality of engaging recesses 34a and the plurality of engaging protrusions 34b are disposed at equal intervals in the peripheral direction. With this, even if the drive gear 31 rotates, the balance of the rotation will not easily become unbalanced, so a smooth rotation of the drive gear 31 will not be inhibited. Meanwhile, the disposition of the engaging recesses and the engaging protrusions can be reversed, the engaging recesses can be installed on the outer member, and the engaging protrusions can be installed on the inner member. With the engagement of the recesses and protrusions of these engaging recesses 34a and the engaging protrusions 34b, the detents can be applied to stop the rotation of the outer member 31b with respect to the inner member 31a.

Figure 6:
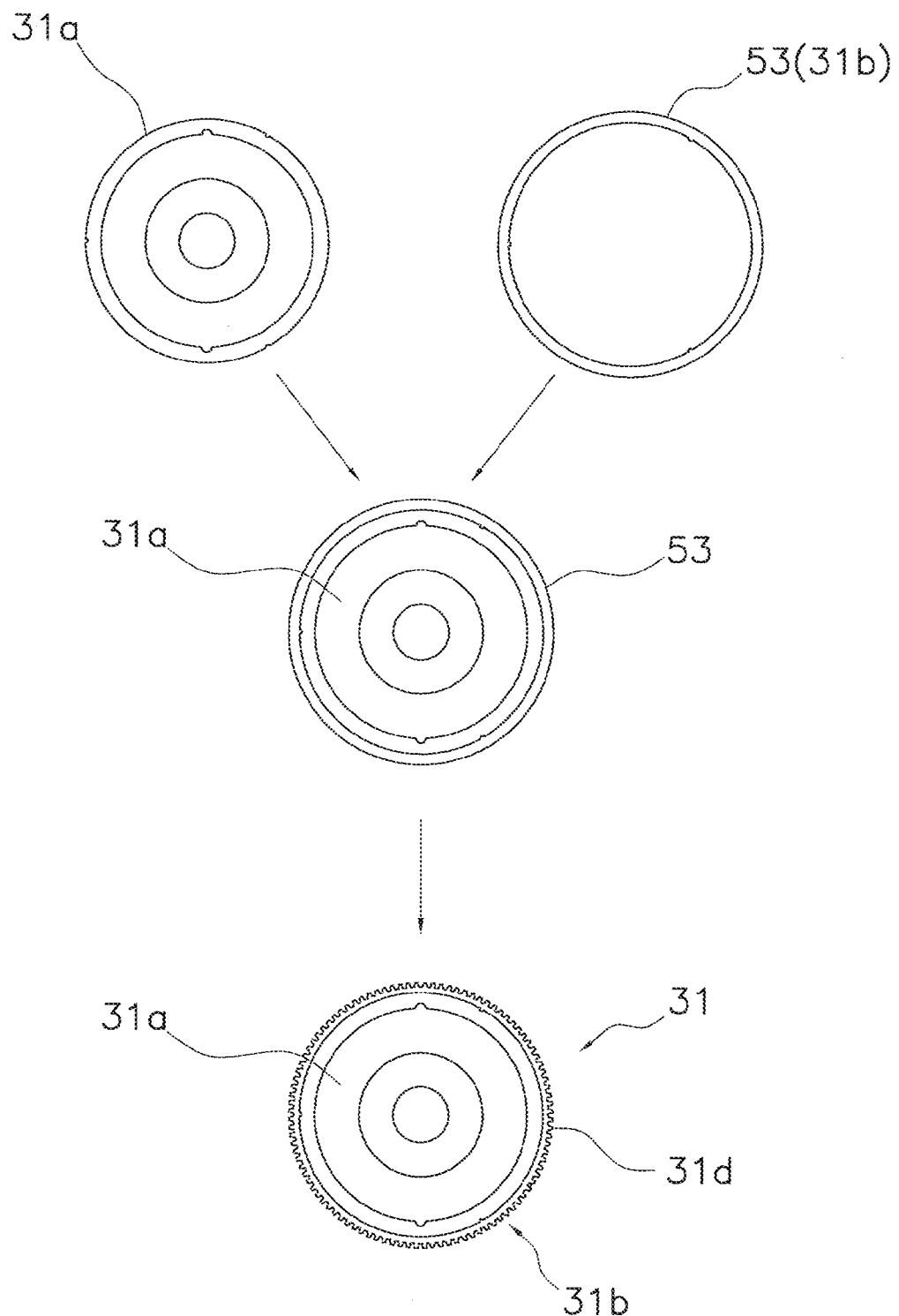
FIG. 6 is a diagram showing the manufacturing process of the drive gear.

As shown in FIG. 6, the drive gear 31 is manufactured from a ring member 53 in which configurations besides the gear teeth 31d are formed and becomes the outer member 31b and the inner member 31a that have all of the configurations, including the surface treatment layer 31c. By press fitting the inner member 31a to the inner peripheral part of the ring member 53 while matching the phase of the engaging recesses 34a and the engaging protrusions 34b and by forming the gear teeth 31d on the ring member 53 after press fitting, the outer member 31b and the drive gear 31 are completed.

The pinion gear 32 configures the rotation transmission mechanism 20 and, at the same time, functions as the clutch mechanism 21. The pinion gear 32 comprises a cross-shaped engaging groove 32a that is formed on one end, a constricted part 32b that is formed at the midpoint, multiple gear teeth 32c that are formed adjacent to the constricted part 32b, and an axle bearing support part 32d that is formed on the other end. The gear teeth 32c of the pinion gear 32 engage with the gear teeth 31d of the drive gear 31. The number of teeth of the gear teeth 32c of the pinion gear 32 is, for example, "18." In FIG. 3, the number of teeth is not accurately depicted.

Since the number of teeth of the pinion gear 32 is large, the height of the teeth of the gear teeth 32c is low. For this reason, a high engaging accuracy is required of the pinion gear 32. In order to realize the above, both ends of the pinion gear 32 are supported by the reel body 1. Specifically, one end of the pinion gear 32 on which the engaging groove 32a is formed and the other end on which the axle bearing support part 32d is formed are each separately supported rotatably by the mechanism mounting plate 16 via the axle bearing 27a and by the second boss part 14b of the second side cover 14 via the axle bearing 27b. Additionally, the pinion gear 32 can move between the clutch on position diagramed in the lower side of the spool shaft axis C in FIG. 2 and the clutch off position diagramed on the upper side of the spool shaft axis C in the spool axial direction.

With this kind of configuration, the torque from the handle 2 is directly transmitted to the spool 115 in a state in which the clutch mechanism 21 is turned ON.

The clutch mechanism 21 comprises a tube-shaped pinion gear 32 that is slidably mounted on the outer peripheral part of the spool axle 25, an engaging groove 32a that is disposed on one part of the pinion gear 32, and a clutch pin 33 that is disposed on the spool axle 25. If the pinion gear 32 is slid along the spool axle 25 and the engaging groove 32a is engaged with the clutch pin 33, the torque is transmitted between the spool axle 25 and the pinion gear 32. This state is the coupled state (the clutch on state). If the engagement of the engaging groove 32 and the clutch pin 33 is disengaged, the torque is not transmitted between the spool axle 25 and the pinion gear 32. This state is the cut-off state (the clutch off state). In the clutch off state, the spool 15 rotates freely. The pinion gear 32 is biased in the direction in which the engaging groove 32a and the clutch pin 33 engage, that is, in the clutch on state, by the clutch operating mechanism 22.

The rotation control mechanism 23 comprises a roller-type, one-way clutch 55 that rotates the drive axle 30 only in the line winding direction (and prohibits the rotation in the line delivering direction), a drag mechanism 57, and a pawl-type, one-way clutch 60. The drag mechanism 57 is a mechanism that applies a predefined braking force to the rotation in the line delivering direction of the spool 15. The drag mechanism 57 can adjust the drag force with the star drag 3. The drag mechanism 57, as shown in FIG. 3, comprises a plurality of drag washers 57a that are mounted on the drive axle 30. A part of the drag washers 57a is integrally and rotatably mounted on the drive axle 30, and the rest are rotatably mounted on the drive axle 30.

The pawl-type, one-way clutch 60 rotates the drive axle 30 only in the line winding direction. The pawl-type, one-way clutch 60, as shown in FIGS. 2 and 3, comprises a ratchet wheel 61 that is integrally and rotatably mounted on the drive axle 30 and a ratchet pawl 62 that can engage with the ratchet wheel 61. The ratchet pawl 62 (refer to FIG. 3) is biased to the ratchet wheel 61 side.

The clutch operating mechanism 22 comprises a clutch operating lever 40 to switch the clutch mechanism 21 into the clutch on and clutch off states. The clutch operating lever 40 is slidably mounted on the outer side surface of the second side cover 14. The clutch operating mechanism 22 moves the pinion gear 32 into the clutch on position and the clutch off position in conjunction with the operation of the clutch operating lever 40.

With a dual-bearing reel that is configured in this way, in a drive gear 31, the outer member 31b is fixed to the inner member 31a comprising a surface treatment layer 31c, after which the gear teeth 31d of the outer member 31b are machined. With this, the surface treatment layer 31c will no longer be easily affected; therefore, the performance of the surface treatment layer 31c can be maintained, and the accuracy of the gear teeth 31d can remain high. Additionally, by using a material with a small specific gravity for the inner member 31a and using that with high rigidity for the outer member 31b, the strength can be maintained, and a lightweight drive gear 31 can be achieved.

In the first embodiment, the drive gear according to the first embodiment of the present invention was explained using a dual-bearing reel as an example; however, in the second embodiment, a drive gear of a spinning reel will be explained.

Figure 7:
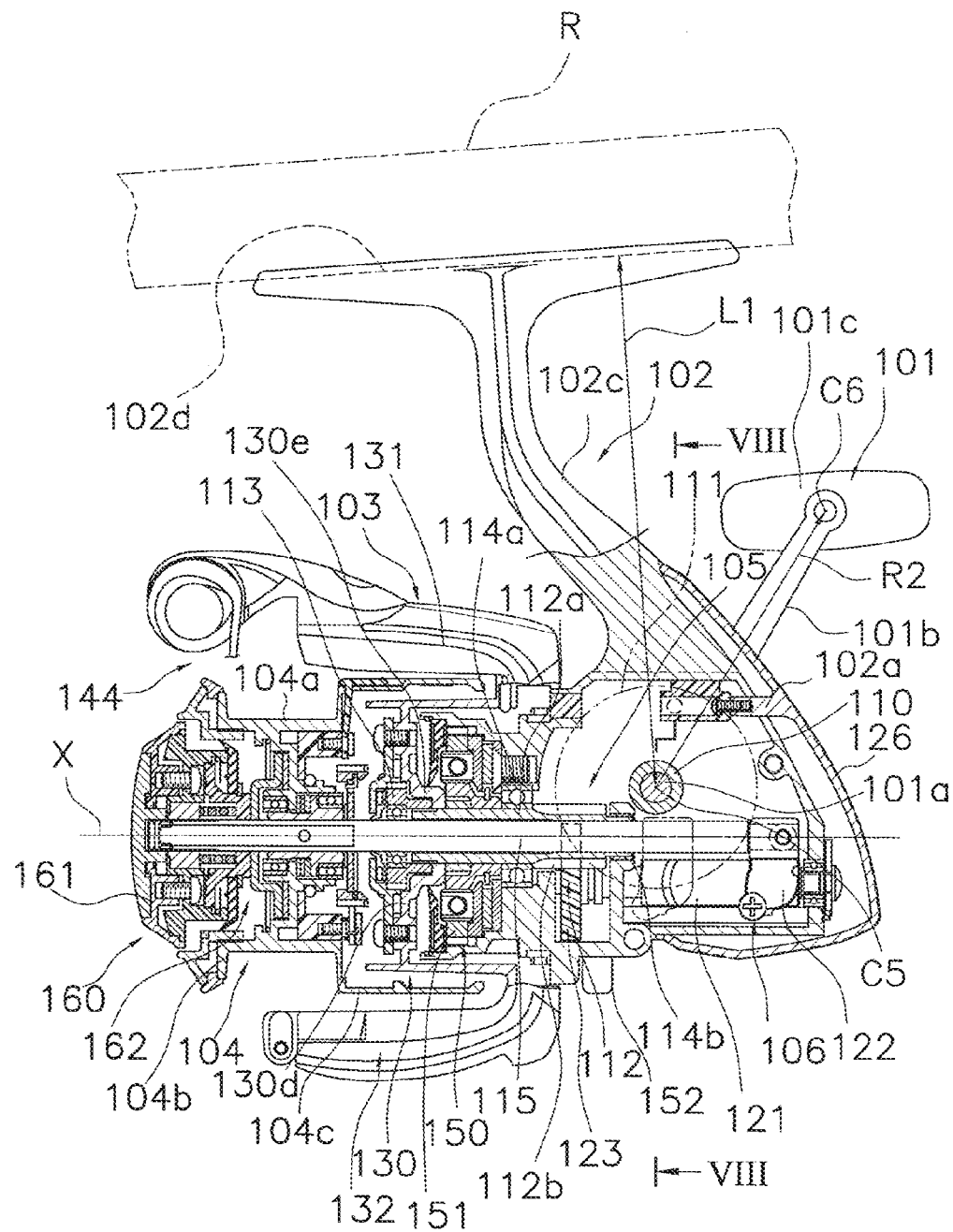
FIG. 7 is a lateral cross-sectional diagram of a spinning reel employing the second embodiment of the present invention.

A spinning reel that employs the second embodiment of the present invention is a medium-sized spinning reel. As shown in FIG. 7, the spinning reel comprises a handle 101, a reel body 102 that rotatably supports the handle 101, a rotor 103, and a spool 104. The rotor 103 is rotatably supported by the front part of the reel body 102. The spool 104 is for winding the fishing line to the outer peripheral surface and is disposed to be movable to the front and back between first rotor arm 131 and the second rotor arm 132 of the rotor 103. The handle 101 can be mounted to either the left side or the right side of the reel body 102.

Figure 8:
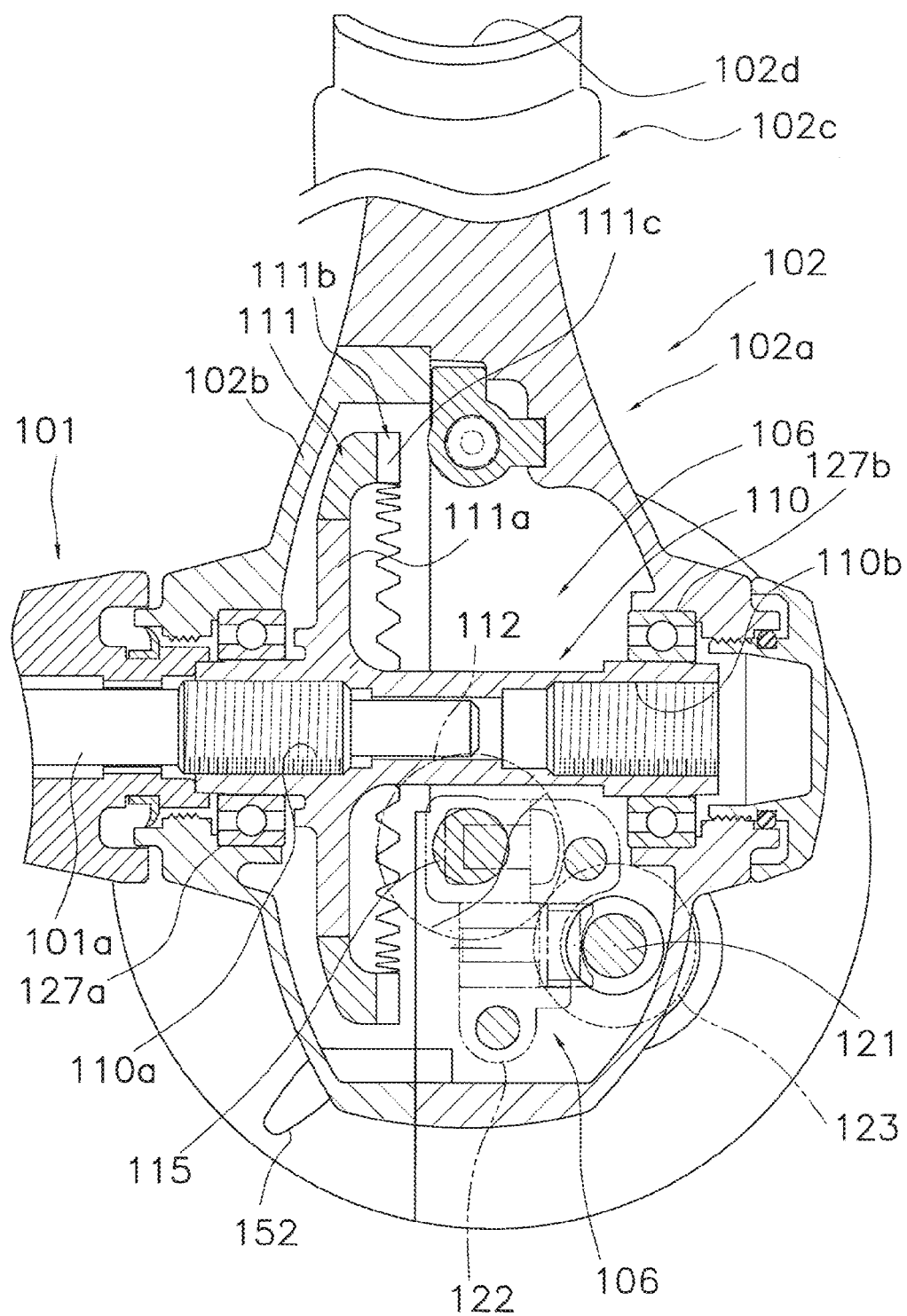
FIG. 8 is a cross-sectional diagram of the section line VIII-VIII in FIG. 7.

The handle 101, as shown in FIG. 7 and FIG. 8, comprises a handle axle 101a, a handle arm 101b that extends from the handle axle 101a in the radial direction, and a handle grip 101c that is rotatably installed at the tip of the handle arm 101b.

The reel body 102 comprises a reel body 102a that has a housing space inside whose side part opens and a cover member 102b (FIG. 8) that is detachably mounted to the reel body 102a to plug the housing space of the reel body 102a. Additionally, the reel body 102 comprises a main body guard 126 that covers the reel body 102a and the rear part of the cover member 102b.

The reel body 102a is, for example, made of a light alloy, such as a magnesium alloy and an aluminum alloy; a T-shaped fishing rod mounting leg 102c that extends forward and backward is integrally formed on the upper part. A mounting seat 102d to which the fishing rod R is mounted forwardly descending in the longitudinal direction is disposed on the upper part of the fishing rod mounting leg 102c. The transverse section of the mounting seat 102d is depressed curving in a circular arc shape.

A rotation transmission mechanism 105 and an oscillating mechanism 106 are installed in the housing space of the reel body 102a, as shown in FIG. 7.

Figure 9:
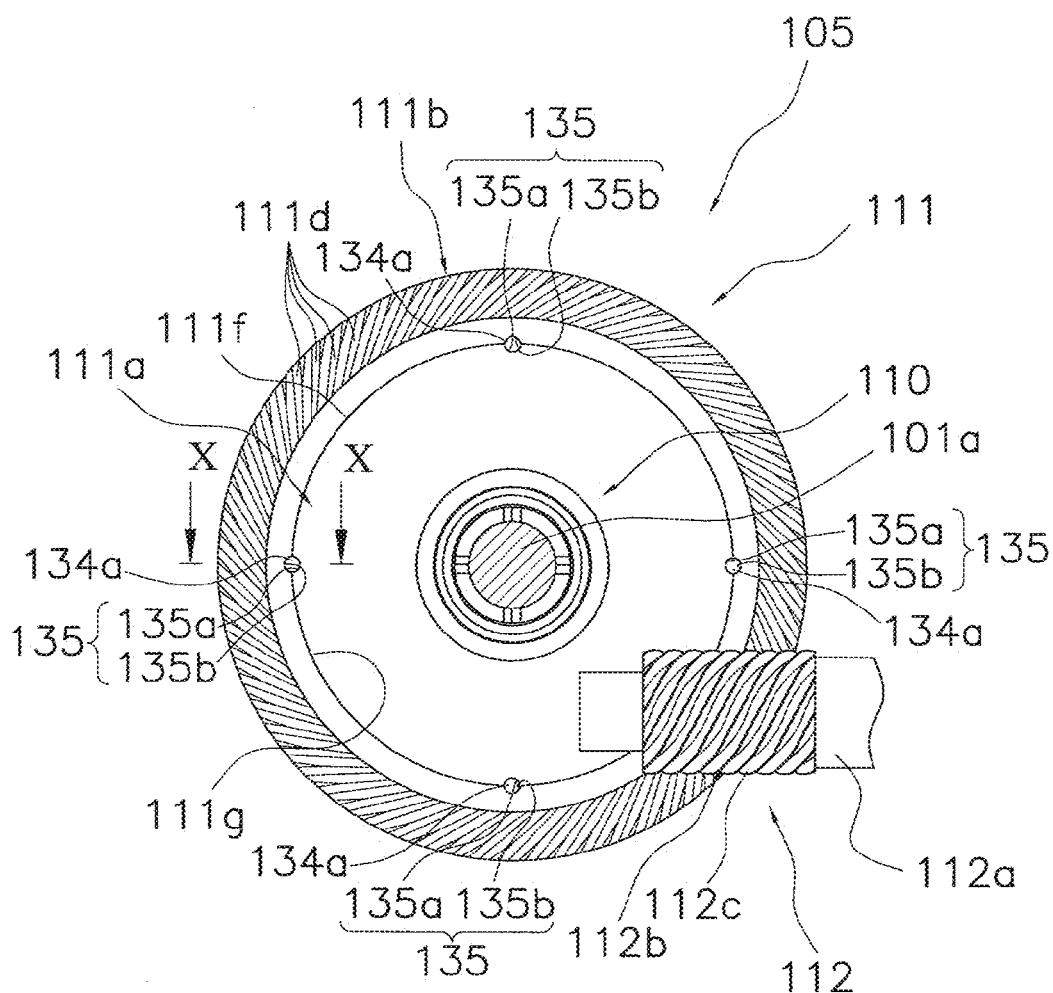
FIG. 9 is a side view of the rotation transmission mechanism of the spinning reel.

The rotation transmission mechanism 105 transmits the rotation of the handle 101 to the rotor 103 as well as the spool 104. The rotation transmission mechanism 105 rotates the rotor 103 in conjunction with the rotation of the handle 101 and moves the spool 104 forward and backward. The rotation transmission mechanism 105, as shown in FIGS. 8 and 9, comprises a drive axle 110 with which the handle axle 101a of the handle 101 is integrally and rotatably coupled, a drive gear 111 consisting of a face gear that rotates along with the drive axle 110, and a pinion gear 112 that engages with this drive gear 111. The drive gear 111 is one example of a reel part according to the second embodiment.

As shown in FIG. 9, the drive gear 111 is formed integrally with or separately from (integrally in this embodiment) the drive axle 110. The drive axle 110 is integrally and rotatably coupled with the handle axle 101a by a threaded coupling or a noncircular engagement (a threaded coupling in this embodiment). The drive axle 110 is rotatably mounted to the reel body 102 by an axle bearing 127a that is mounted on a cover member 102b and an axle bearing 127b that is mounted on the reel body 102a. A left female threaded part 110a and a right female threaded part 110b that screw onto the handle axle 101a are formed on the inner peripheral surface of both ends of the drive axle. Here, the left female threaded part 110a on the near side of the drive gear 111 is a left screw, and the right female threaded part 110b that is on the far side of the drive gear 111 is a right screw. Therefore, there are two kinds of handle axes 101a that are prepared, one for the right screw and another for the left screw.

Figure 10:
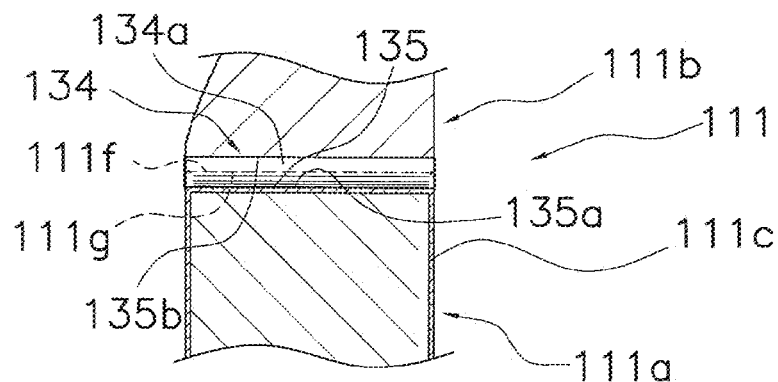
FIG. 10 is a cross-sectional diagram of the section line X-X in FIG. 9.

The drive gear 111, as shown in FIGS. 8, 9 and 10, comprises an inner member 111a that is integrally formed with the drive axle 110 and that has a surface treatment layer 111c (refer to FIG. 10); and an annular ring-shaped outer member 111b that is fixed on the outer peripheral side of the inner member 111a and that has multiple face gear teeth 111d on one side surface of the outer peripheral side. The multiple face gear teeth 111d are disposed with a gap in the circumferential direction.

The inner member 111a, along with the drive axle 110, is a first metallic member with a relatively small specific gravity, such as an aluminum alloy and a magnesium alloy. The inner member 111a is formed by casting the first metal, after which a surface treatment layer 111c is formed. The inner member 111a comprises a circular outer peripheral part 111f that is fixed to the outer member 111b by press fitting. In the case that the inner member 111a is made from an aluminum alloy or a magnesium alloy, the surface treatment layer 111c is a corrosion-resistant layer such as an anodic oxide layer, etc. The surface treatment layer 111c is formed on the entire surface of the outer surface, including an outer peripheral part 111f of the inner member 111a, a semi-circular first engaging recess 135a with which a detent part 134 mentioned below engages, and a surface that intersects perpendicularly with the axis of the drive axle 110, etc.

The outer member 111b is a second metallic member with a larger specific gravity and a higher rigidity than the inner member 111a, for example a zinc alloy or a stainless steel alloy. The outer member 111b further comprises a circular inner peripheral part 111g that fits the outer peripheral part 111f of the inner member 111a. The face gear teeth 111d formed on the outer peripheral surface are one example of a processed part, and they are formed through casting after the outer member 111b is fixed to the inner member 111a. The number of teeth of the face gear teeth 111d is, for example, between 50 and 70; the outer diameter is, for example, around 26 mm; and the inner diameter is, for example, around 21 mm.

Additionally, the drive gear 111 further comprises a detent part 134 that is installed between the inner member 111a and the outer member 111b and that engages with the inner member 111a and the outer member 111b and prevents the rotation of the inner member 111a and the outer member 111b. In the second embodiment, the detent part 134 comprises a plurality of rotation brake pins 134a (for example, 4) that engage with the inner member 111a and the outer member 111b. Therefore, in the second embodiment, the detent part 134 is installed separately from the inner member 111a and the outer member 111b. The rotation brake pins 134a fit through-hole 135 that is formed from a plurality of first engaging recesses 135a (for example, 4) that are formed as a semi-circle on the outer peripheral part 111f of the inner member 111a and a plurality of second engaging recesses 135b (for example, 4) that are formed in a semi-circle on the inner member 111g of the outer member 111b. The rotation brake pin 134a is stopped in the through-hole 135 by caulk fixing that presses both ends and plastically deforms them. The plurality of through-holes 135 is disposed in the circumferential direction at equal intervals. With this, even if the drive gear 111 rotates, the balance of the rotation will not easily become unbalanced; therefore, a smooth rotation of the drive gear 111 will not be inhibited.

The pinion gear 112, as shown in FIG. 9, comprises a tube-shaped gear main body 112a and a gear part 112b that comprises a helical gear 112c and that is formed on the rear part outer peripheral surface of the gear main body 112a. The gear main body 112a is rotatably mounted on the reel body 102a around an axis that crisscrosses the handle axle 101a (around the spool axle 115). The gear main body 112a, as shown in FIG. 7, is rotatably supported by a reel body 102a by a front axle bearing 114a and a rear axle bearing 114b in the vicinity of the gear part 112b. The spool axle 115 can penetrate the center of the gear main body 112a. A nut 113 for fixing the rotor 103 screws onto the front end outer peripheral surface for the gear main body 112a. The rotor 103 is integrally and rotatably coupled to the front part outer peripheral surface of the gear main body 112a.

The oscillating mechanism 106, as shown in FIGS. 7 and 8, is a mechanism for moving a spool axle 115 that is coupled to the center part of the spool 104 via a drag mechanism 160 forward and backward to move the spool 104 in the same direction. The oscillating mechanism 106 comprises a traverse camshaft 121 that is disposed in parallel under the spool axle 115, a slider 122 that is guided to the reel body 102a in the longitudinal direction along the traverse camshaft 121, and an intermediate gear 123 that is fixed to the tip of the traverse camshaft 121. The slider 122 is fixed non-rotatably to the rear end of the spool axle 115. An intermediate gear 123 engages with the pinion gear 112.

The rotor 103, as shown in FIG. 7, is a light alloy such as a magnesium alloy and an aluminum alloy, is non-rotatably coupled to the pinion gear 112, and is rotatable with respect to the reel body 102. The rotor 103 comprises a tube section 130 that is integrally and rotatably coupled with the pinion gear 112, and a first rotor arm 131 and a second rotor arm 132 that are connected to a position facing the rear part of the tube section 130 and that extend forward with a space between them and the tube section 130.

The tube section 130 comprises a disc-shaped wall part 130d on the front part inner peripheral side, and an annular boss section 130e that is integrally and rotatably coupled with the pinion gear 112 is formed in the center part of the wall part 130d. The front part of the pinion gear 112 penetrates the inner peripheral part of this boss section 130e, and the boss section 130e is integrally and rotatably locked to the front part of the pinion gear 112. By screwing in the nut 113 into the pinion gear 112 in this state, the rotor 103 is fixed to the pinion gear 112. A bail arm 144 that guides the fishing line to the spool 104 in the line releasing direction and the line winding direction is slidably mounted on the outer peripheral side of the tip of the first rotor arm 131.

A reverse rotation prevention mechanism 150 is disposed inside of the tube section 130 of the rotor 103 for prohibiting releasing the reverse rotation of the rotor 103. The reverse rotation prevention mechanism 150 has a roller-type, one-way clutch 151 whose inner ring idles and a switching lever 152 that switches the one-way clutch 151 between the operating state (the reverse rotation prohibited state) and the non-operating state (the reverse rotation permitted state). The switching lever 152 is slidably mounted on the reel body 102a. A cam, which is not diagramed, is installed on the tip of the switching lever 152; if the switching lever 152 is oscillated, the one-way clutch 151 switches between the operating state and the non-operating state due to the cam.

The spool 104, as shown in FIG. 7, is disposed between the first rotor arm 131 and the second rotor arm 132 of the rotor 103 and is mounted to the tip of the spool axle 115 via a drag mechanism 160. The spool 104 comprises a bobbin trunk 104a, the outer periphery to which is wound the fishing line, a tube-shaped skirt section 104c that is integrally formed with the bobbin trunk 104a at the rear of the bobbin trunk 104a, and a large-diameter flange part 104b that is installed on the front end of the bobbin trunk 104a.

The drag mechanism 160 brakes the rotation of the spool 104 and comprises a drag adjustment knob 161 that is screwed onto the tip of the spool 115 and a braking section 162 that is pressed by the drag adjustment knob 161 and that brakes the spool 104.

With a spinning reel that is configured in this way, in a drive gear 111, the face gear teeth 111d of the outer member 111b are cast after fixing the outer member 111b to the inner member 111a, which has a surface treatment layer 111c. With this, the surface treatment layer 111c will no longer be easily affected; therefore, the performance of the surface treatment layer 111c can be maintained, and the accuracy of the gear teeth 111d can remain high. Additionally, by using a material with a small specific gravity for the inner member 111a and by using that with high rigidity for the outer member 111b, the strength can be maintained, and a lightweight drive gear 111 can be achieved.

The embodiments of the present invention were described above, but the present invention is not limited to the above-described embodiments; various modifications can be made without departing from the scope of the invention. Specifically, the various embodiments and modified examples described in the present Specification can be freely combined according to necessity.

In the following explanation, members with configurations that differ from the first embodiment are expressed by adding a number in the hundreds digit to the reference symbols in the first embodiment. Thus, regarding members with the same configuration, the same reference symbols are used as the members in the first embodiment.

Figure 11:
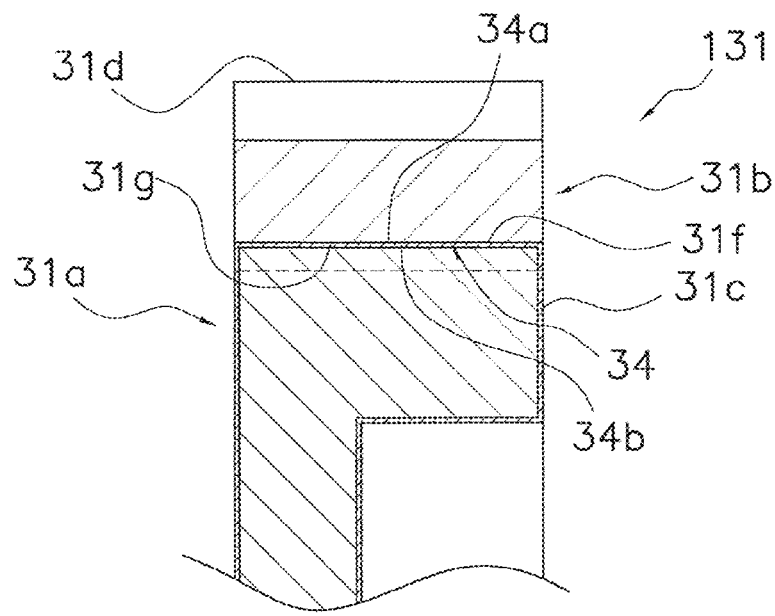
FIG. 11 is a diagram corresponding to FIG. 5 of another embodiment.

(a) In the aforementioned embodiments, the inner member 31a (or 111a) is fixed by press fitting, but the present invention is not limited to this configuration. In the drive gear 231 shown in FIG. 11, the inner member 31a is adhered to the outer member 31b by an appropriate adhesive agent. Meanwhile, the detent part 34 has the same configuration as in the first embodiment. In this case, an adhesive reservoir with a recess that can store the adhesive agent can be installed in either the outer peripheral part 31f of the inner member 31a or in the inner peripheral part 31g of the outer member 31b.

Figure 12:
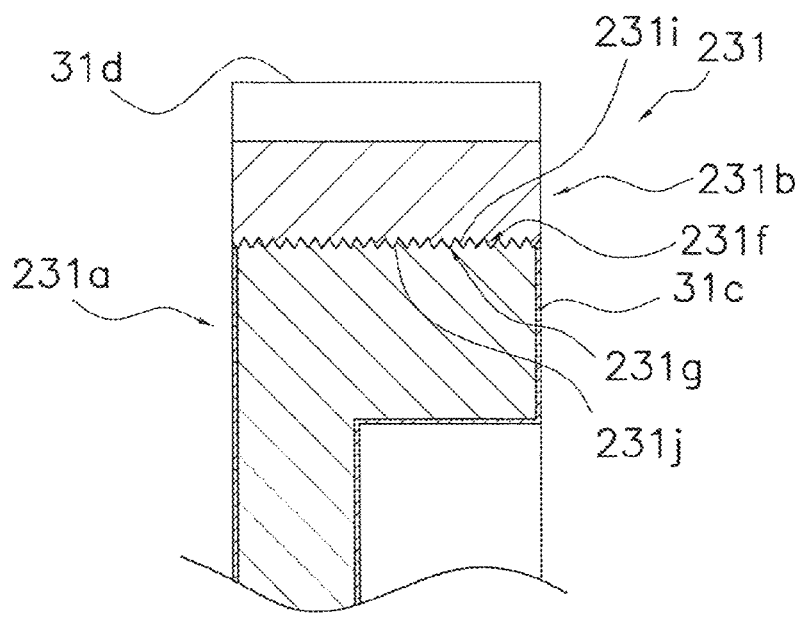
FIG. 12 is a diagram corresponding to FIG. 5 of another embodiment.

(b) With the drive gear 331 shown in FIG. 12, the inner member 231 comprises a male threaded part 231i in the outer peripheral part 231f, and the outer member 231b comprises a female threaded part 231j that screws into the male threaded part 231i in the inner peripheral part 231g. Here, the inner member 231a and the outer member 231b are fixed by a threaded engagement. In this case, due to the rotation braking, caulk fixing both end parts of the outer peripheral part 231f of the inner member 231a to the outer member 231b by plastic deformation is preferable.

Figure 13:
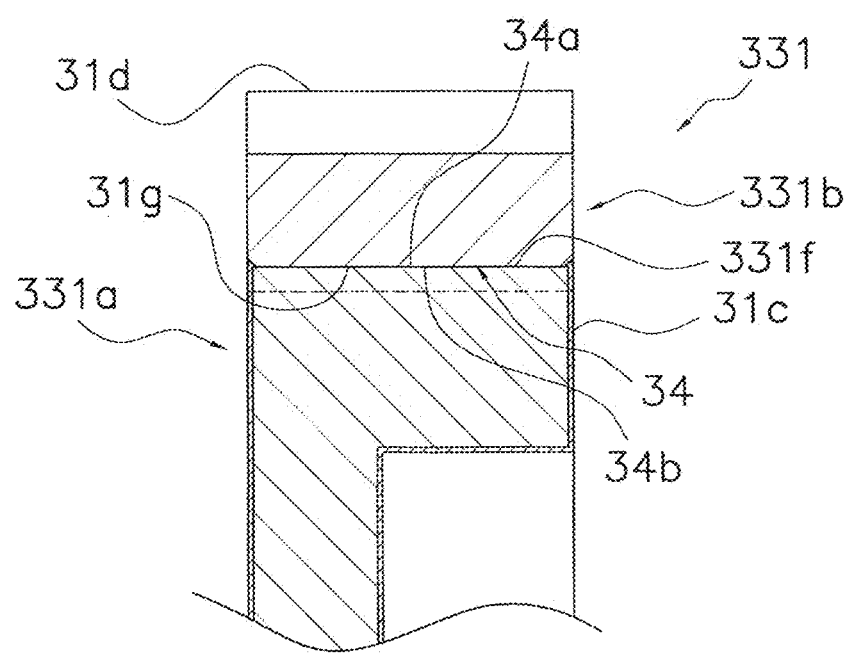
FIG. 13 is a diagram corresponding to FIG. 5 of yet another embodiment.

(c) With the drive gear 331 shown in FIG. 13, the outer member 331b is fixed by the plastic deformation of the inner member 331a with respect to the outer member 331b. Specifically, by plastically deforming both end parts of the outer peripheral part 331 of the inner member 331a toward the outer member 331b, the outer member 331b is fixed to the inner member 331a.

(d) In the aforementioned embodiments, the shape of the detent part was configured to be circular, but the present invention is not limited to this configuration. The configuration of the detent part can be any shape, so long as the shape can prevent the rotation of the inner member and the outer member.

(e) in the aforementioned embodiment, for the outer member 31b (or 111b) having gear teeth 31d for face gear teeth 111d) as the processed part, zinc alloys and stainless steel alloys were used as examples, but the present invention is not limited to this configuration. The outer member can be anything as long as the metal has a larger specific gravity and a higher rigidity than that of the inner member.

The embodiments described above can be expressed as the following.

(A) The drive gear 31 (or 111) as the reel part comprises an inner member 31a (or 111a) and an outer member 31b (or 111b). The inner member (or 111a) comprises a surface treatment layer 31c (or 111c). The outer member 31b (or 111b) comprises gear teeth 31d (or face gear teeth 111d) that are fixed on the outer peripheral side of the inner member 31a (or 111a) and are processed after they are fixed to the inner member 31a (or 111a).

In this drive gear 31 (or 111), the gear teeth 31d (or face gear teeth 111d) of the outer member 31b (or 111b) are processed after fixing the outer member 31b (or 111b) to the inner member 31a (or 111a) that has a surface treatment layer 31c (or 111c). With this, the surface treatment layer 31c (or 111c) will no longer be affected; therefore, the performance of the surface treatment layer 31c (or 111c) can be maintained, and the accuracy of the gear teeth 31d (or face gear teeth 111d) can remain high. Additionally, by using a material with a small specific gravity for the inner member 31a (or 111a) and by using that with high rigidity for the outer member, the strength can be maintained, and a light weight can be achieved.

(B) The processed part can comprise gear teeth 31d (or face gear teeth 111d). In this case, the strength of the gear teeth 31d (or face gear teeth 111d) can be maintained.

(C) The gear teeth 31d can also be formed by machining. In this case, the gear teeth 31d can be formed with a high degree of accuracy.

(D) The gear teeth 111d can also be formed by casting. In this case, the face gear teeth 111d, which increase the cost when formed by machining, can be formed while suppressing an increase in cost.

(E) The inner member 31a (or 111a) can be made from a first metal having a corrosion-resistant layer as the surface treatment layer 31c (or 111c), and the outer member 31b (or 111b) can have gear teeth 31d (or face gear teeth 111d) and can be made from a second metal that has a specific gravity that is larger and a rigidity that is higher than the first metal. In this case, lightweight gears can be achieved while the strength and corrosion resistance of the gear teeth 31d (or face gear teeth 111d) are maintained.

(F) The inner member 31a (or 111a) can fit the outer member 31b (or 111b) and can be fixed to the outer member 31b (or 111b) by press fitting. In this case, the inner member 31a (or 111a) and the outer member 31b (or 111b) can be solidly fixed by press fitting.

(G) The inner member 31a (or 111a) can be fixed to the outer member 31b (or 111b) by plastic deformation towards the outer member 31b (or 111b). In this case, for example, the inner member 31a (or 111a) and the outer member 31b (or 111b) can be solidly fixed by plastic deformation, such as caulk fixing, etc.

(H) The inner member 31a (or 111a) can be fixed to the outer member 31b (or 111b) by bonding. In this case, the inner member 31a (or 111a) and the outer member 31b (or 111b) can be easily fixed. Additionally, by combining the fixing and bonding by press fitting or plastic deformation mentioned above, the inner member 31a (or 111a) and the outer member 31b (or 111b) can be more solidly fixed.

(I) The inner member 231a can comprise a male threaded part 231i and the outer member 231b can comprise a female threaded part 231j that screws into the male threaded part 231i. In this case, the inner member 231a and the outer member 231b can be easily fixed by a threaded engagement.

(J) The inner member 31a (or 111a) and the outer member can each comprise a detent part 34 (or 134) to engage with each other and to prevent the rotation. In this case, since the brakes will be applied to stop the rotation of the inner member 31a (or 111a) and the outer member 31b (or 111b), even if the inner member 31a (or 111a) and the outer member 31b (or 111b) are fixed by press fitting, elastic deformation, bonding, etc., the inner member 31a (or 111a) and outer member 31b (or 111b) can be reliably rotated integrally.

(K) The inner member 31a (or 111a) can be mounted on a drive axle 30 (or 110) that rotates in conjunction with a handle 2 (or 101) of the fishing reel, and the gear teeth 31d (or the face gear teeth 111d) of the outer member 31b (or 111b) can engage with a pinion gear 32 (or 112) that rotates around a spool axle 25 (or 115) of the fishing reel. In this case, a lightweight drive gear 31 (or 111) can be achieved while maintaining the accuracy, the strength, and the surface treatment layer performance of the drive gear 31 (or 111) of a dual-bearing reel, a spinning reel or a single-bearing reel.

(L) The fishing reel can be a dual-bearing reel that has a spool 15 that rotates around a shaft axis that is parallel to the shaft axis of the handle 2. The inner member 31a is rotatably mounted on a drive axle 30 in conjunction with a drive axle 30 of a dual-bearing reel. In this case, in a dual-bearing reel, a lightweight drive gear 31 can be achieved while maintaining the accuracy, strength, and surface treatment layer performance of the drive gear 31.

(M) The fishing reel can be a spinning reel having a spool 104 that moves forward and backward in the axial direction that crisscrosses with the shaft axis of the handle 101, and the inner member 111a can be integrally and rotatably mounted on the drive axle 110 of the spinning reel. In this case, in a spinning reel, a lightweight drive gear 111 can be achieved while maintaining the accuracy, strength, and surface treatment layer performance of the drive gear 111.

What is claimed is:

1. A reel part for a fishing reel comprising:
   an inner member having a surface treatment layer, and
   an outer member fixed to an outer peripheral side of the inner member, the outer member including a processed part that is processed after being fixed to the inner member.

2. The reel part according to claim 1, wherein
   the processed part comprises a plurality of gear teeth.

3. The reel part as recited in claim 2, wherein
   the gear teeth are machined gear teeth.

4. The reel part as recited in claim 2, wherein
   the gear teeth are casted gear teeth.

5. The reel part as recited in claim 2, wherein
   the inner member is a first metal having a corrosion-resistant layer as the surface treatment layer, and
   the outer member is a second metal with a larger specific gravity and a higher rigidity than the first metal, the gear teeth are made of the second metal.

6. The reel part as recited in claim 2, wherein
   the inner member is press fitted to the outer member.

7. The reel part as recited in claim 2, wherein
   the inner member is plastically deformed to the outer member to fix the inner member to the outer member.

8. The reel part as recited in claim 2, wherein
   the inner member is bonded to the outer member.

9. The reel part as recited in claim 2, wherein
   the inner member includes a male threaded part, and
   the outer member includes a female threaded part screwed into the female threaded part.

10. The reel part as recited in claim 2, further comprising
    a detent part that is installed between the inner member and the outer member and that engages with the inner member and the outer member and prevents a rotation of the inner member and the outer member.

11. The reel part as recited in claim 2, wherein
    the inner member is configured to be mounted to a drive axle that rotates in conjunction with a handle of the fishing reel, and
    the gear teeth of the outer member are configured to engage with a pinion gear that rotates around a spool axis of the fishing reel.

12. A dual-bearing reel including the reel part as recited in claim 2, and further comprising
    a handle;
    a drive axle operatively coupled to the handle; and
    a spool that rotates around a spool axis that is parallel to an axis of the drive axle,
    the inner member being mounted to the drive axle that rotates in conjunction with the drive axle,
    the gear teeth of the outer member being engaged with a pinion gear that rotates around the spool axis.

13. A spinning reel including the reel part as recited in claim 2, and further comprising
    a handle;
    a drive axle operatively coupled to the handle; and a spool that rotates around a spool axis and moves forward and backward in an axial direction of the spool axis, the spool axis being transverse to an axis of the drive axle, and the inner member being integrally and rotatably mounted on the drive axle, the gear teeth of the outer member being engaged with a pinion gear that rotates around the spool axis.

\* \* \* \* \*